United States Patent [19]

Baba

[11] Patent Number: 4,480,953

[45] Date of Patent: Nov. 6, 1984

[54] MULTIPLE MODE PALLETIZING APPARATUS

[75] Inventor: Kiyokazu Baba, Komatsu, Japan

[73] Assignee: Kabushiki Kaisha Komatsu Seisakusho, Tokyo, Japan

[21] Appl. No.: 494,395

[22] Filed: May 13, 1983

[30] Foreign Application Priority Data

May 17, 1982 [JP] Japan .................................. 57-81617

[51] Int. Cl.³ .................... B65H 31/06; B65H 31/22; B65H 31/32
[52] U.S. Cl. ..................................... 414/27; 271/185; 271/194; 414/50; 414/72; 414/79; 414/107; 414/110
[58] Field of Search ....................... 414/27, 50, 69, 70, 414/71, 72, 79, 103, 107, 110; 271/184, 185, 194, 214, 218

[56] References Cited

U.S. PATENT DOCUMENTS

| | | | |
|---|---|---|---|
| 2,010,732 | 8/1935 | Mandusic | 271/218 |
| 2,205,767 | 6/1940 | Lamb | 271/218 X |
| 3,240,356 | 3/1966 | Hill | 414/27 |
| 3,343,690 | 9/1967 | Dean | 414/103 X |
| 3,411,641 | 11/1968 | Dean | 414/72 X |

*Primary Examiner*—Leslie J. Paperner

*Attorney, Agent, or Firm*—Armstrong, Nikaido, Marmelstein & Kubovcik

[57] ABSTRACT

Apparatus suitable to be appended to a transfer press system, which fabricates panel products of various shapes and sizes, for palletizing them in any of several different modes depending upon the nature of the pressings. As a conveyor transports successive pressings from the transfer press system, a loader picks up one pressing at a time from the conveyor and carries it to a loading station, where the pressing is released either in a recumbent attitude or, after being turned 90 degrees, in an upstanding attitude. Released recumbently, the successive pressings are stacked on a pallet either in a controlled flatwise loading mode or in a free-fall flatwise loading mode. A controlled flatwise loading mechanism and a retractable fork assembly are provided for the two flatwise loading modes. Either an insert loading mode or an edgewise loading mode is possible for the pressings released upstandingly from the loader. For the insert loading mode a pallet is used which has planted thereon uprights with horizontal arms extending from their top ends, in combination with pressings having apertures formed therein. An insert loading mechanism transfers the apertured pressings from the loader onto the horizontal arms on the pallet. The pallet with the uprights also allows the pressings to be loaded edgewise thereon by leaning against the uprights.

5 Claims, 6 Drawing Figures

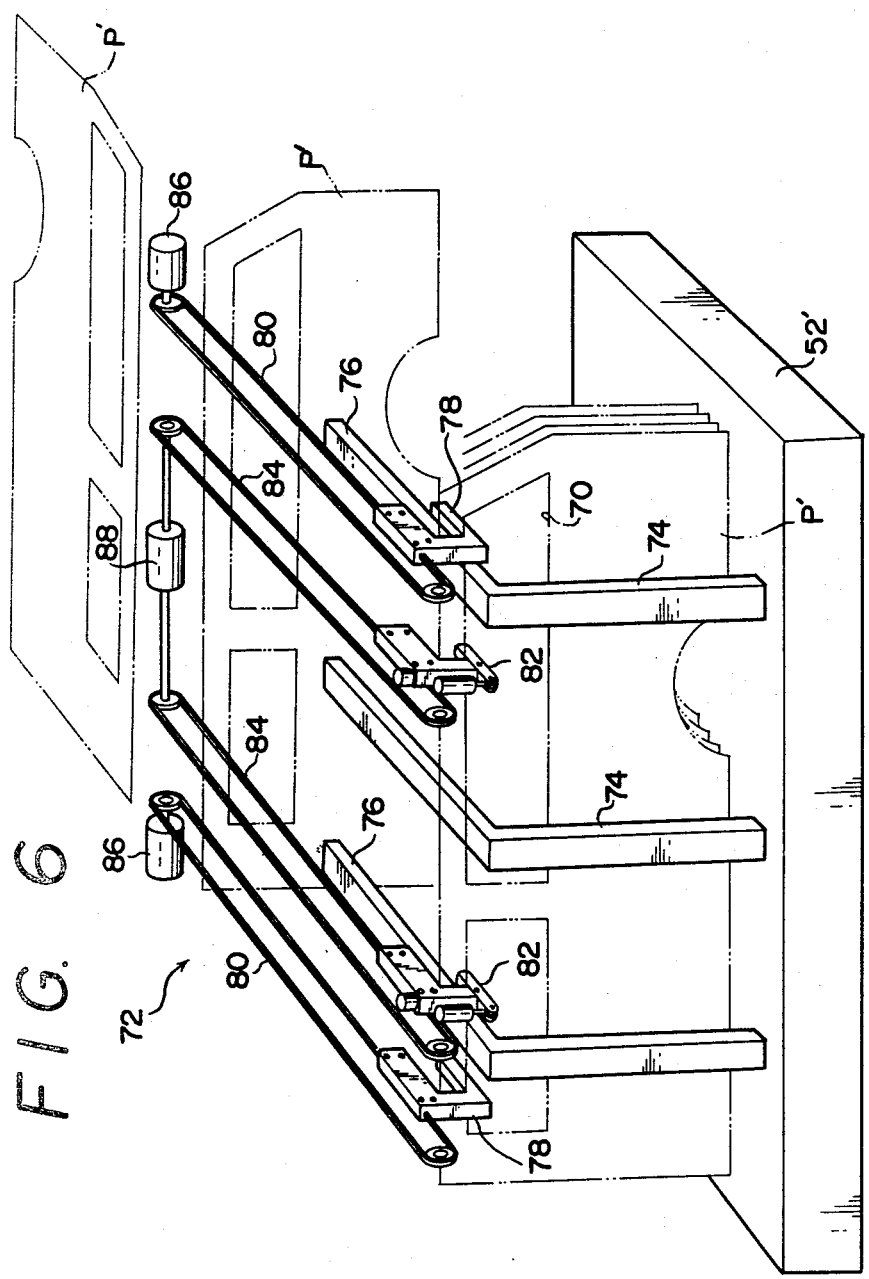

MULTIPLE MODE PALLETIZING APPARATUS

BACKGROUND OF THE INVENTION

This invention relates to apparatus for loading manufactured articles on pallets for storage or shipment, and more specifically to such palletizing apparatus affording a choice from among several different loading modes suiting the various shapes, sizes, thicknesses, or like physical characteristics of the articles. The multiple mode palletizing apparatus according to the invention offers particular utility in conjunction with a transfer press system, although no unnecessary limitations thereto are intended.

The transfer press system is a streamlined machine capable of continuous fabrication of a variety of panel products such as those used for roofing, flooring, and doors. Thus the pressings come out of the machine in various shapes, sizes, thicknesses, etc. Difficulties have been encountered in loading such different classes of pressings on pallets. No matter how high the rate may be made at which the press system manufactures the panel products, its actual production is limited unless the various classes of products are palletized at a matching rate.

SUMMARY OF THE INVENTION

The present invention provides apparatus capable of efficiently palletizing a variety of panel products or like generally flat articles, with or without apertures formed therein, in several different modes suiting the physical characteristics of the articles. The invention also makes possible the uninterrupted supply of the articles to the apparatus during each change from a loaded pallet to an empty one.

Basically the multiple mode palletizing apparatus according to the invention comprises a conveyor for transporting in a recumbent attitude a succession of articles from a supply station to a pickup station. At the latter station a loader picks up one article at a time from the conveyor and carries it to a loading station, where the article is released either in the original recumbent or horizontal attitude or, after being turned 90 degrees, in an upstanding attitude. Released horizontally, the successive articles are palletized either in a controlled flatwise loading mode, by means which receive and deposit them on a pallet one on top of another, or in a free-wall flatwise loading mode with the aid of a retractable fork assembly which receives and temporarily holds the articles released during a change from one pallet to another. On the other hand, if the articles released upstandingly from the loader have apertures formed therein, an insert loading mechanism receives and loads the articles on a pallet having formed thereon a plurality of uprights with arms extending horizontally from their top ends. These arms are inserted in the apertures in the articles, thus supporting them vertically over the pallet in what is herein termed the insert loading mode. Further the pallet with the uprights also allows the articles released upstandingly from the loader to be loaded edgewise thereon by leaning against the uprights.

Thus the apparatus admits of palletization in either of the controlled flatwise loading mode, the free-fall flatwise loading mode, the insert loading mode, and the edgewise loading mode. During operation in either mode the apparatus necessitates no interruption in the supply of articles during pallet changes.

The above and other features and advantages of this invention and the manner of attaining them will become more apparent, and the invention itself will best be understood, from a study of the following description and appended claims taken together with the attached drawings showing a preferred embodiment of the invention.

BRIEF DESCRIPTION OF THE DRAWINGS

FIG. 6 is an enlarged perspective view of the insert loading mechanism in the multiple mode palletizing apparatus.

DESCRIPTION OF THE PREFERRED EMBODIMENT

Figure 1:
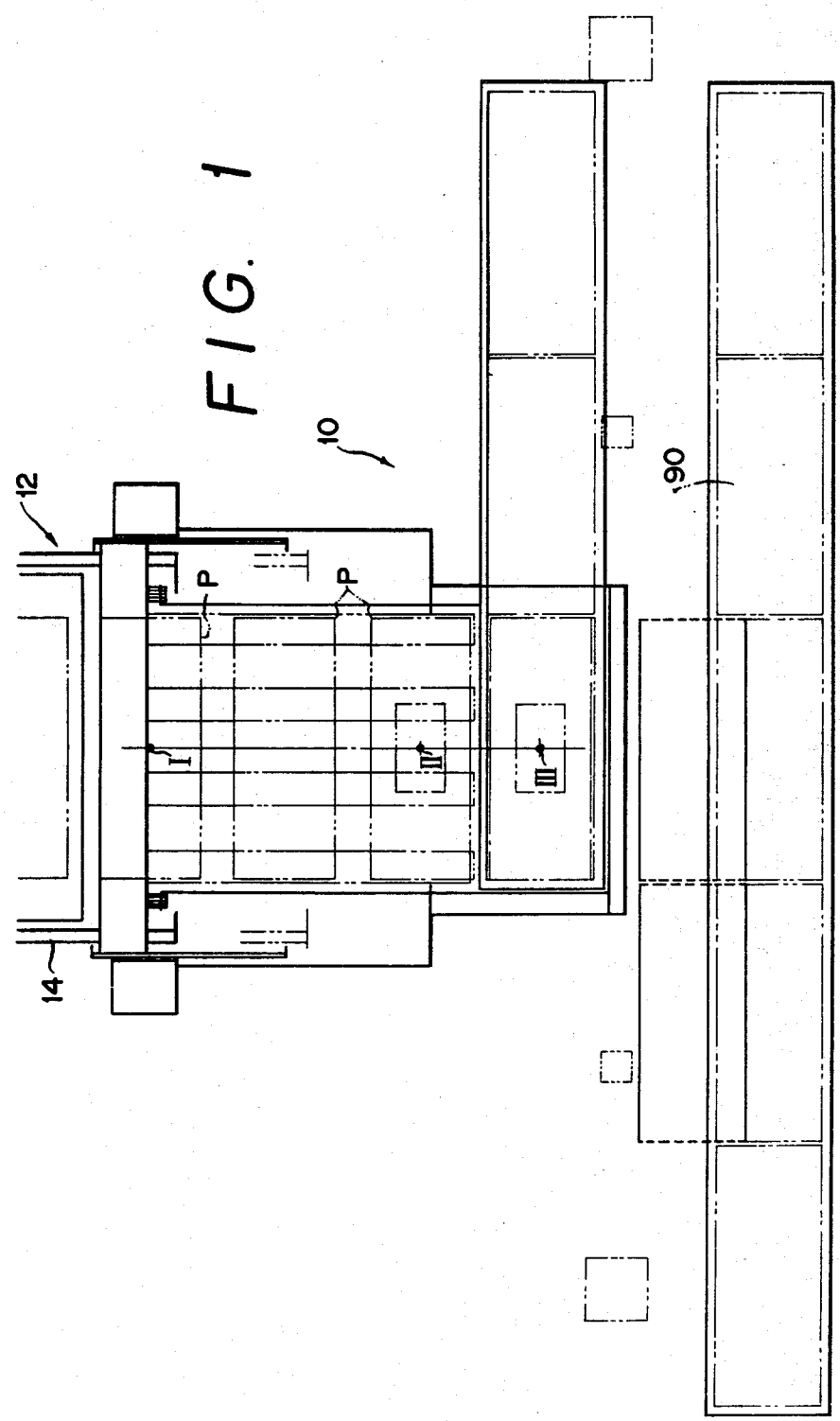
FIG. 1 is a digrammatic plan showing the layout of the multiple mode palletizing apparatus embodying the principles of the invention, the apparatus being shown adapted for use with a transfer press system.
Figure 2:
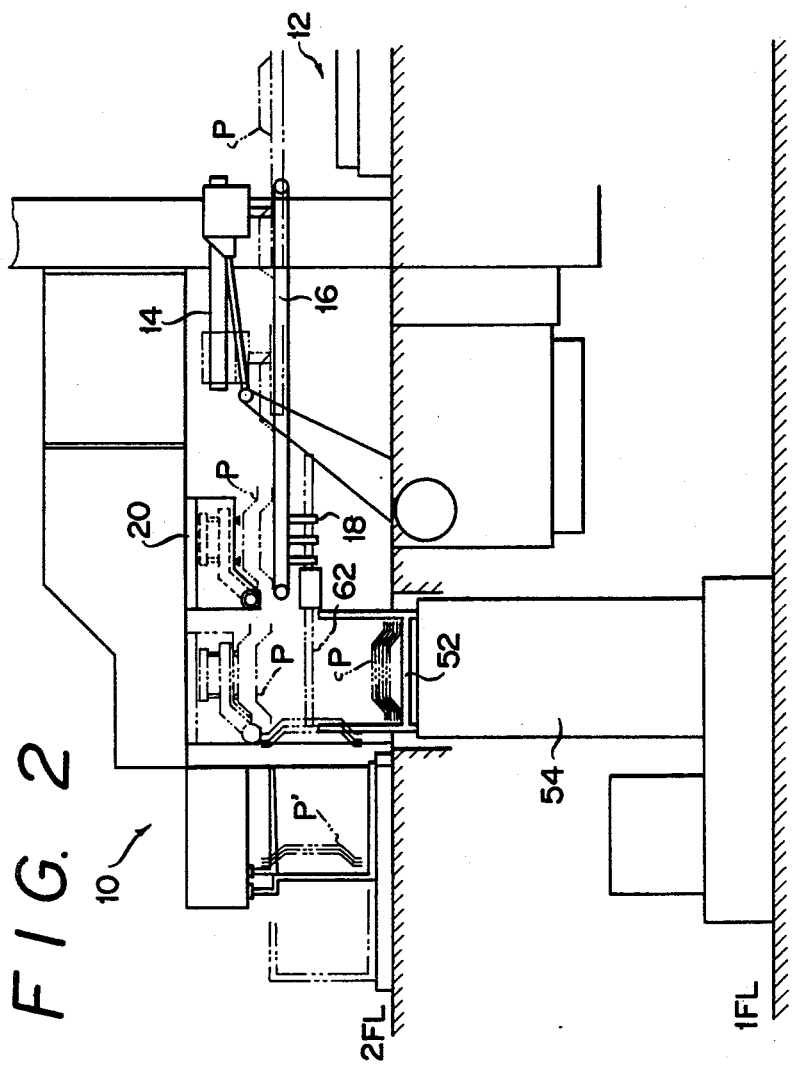
FIG. 2 is a diagrammatic side elevation of the multiple mode palletizing apparatus of FIG. 1.

The exemplary multiple mode palletizing apparatus in accordance with the invention is shown in its entirety in FIGS. 1 and 2 and generally designated 10. The apparatus is appended to a transfer press system 12 at its output end. The transfer press system 12 is conventionally equipped with a work indexing mechanism 14 which transports work through successive press stations as well as into and out of the machine. Thus the work indexing mechanism 14 serves to supply completed pressings P to the apparatus 10 of this invention for palletization.

The multiple mode palletizing apparatus 10 includes a conveyor 16 extending horizontally from the output end of the transfer press system 12. As indicated in FIG. 1, the conveyor 16 transports the pressings P from supply station I to pickup station II. The work indexing mechanism 14 of the transfer press system 12 places the pressings P one after another on the conveyor 16 in a recumbent attitude at the supply station I. At the pickup station II the successive pressings P are picked up from the conveyor 16 and carried over to a loading station III, farther away from the transfer press system 12, by means set forth hereafter.

Underlying the conveyor 16 at the pickup station II is a lifter 18 for rasing the successive pressings P from the conveyor. Each lifted pressing P is sucked by a loader 20 and thereby transported to the loading station III.

Figure 3:
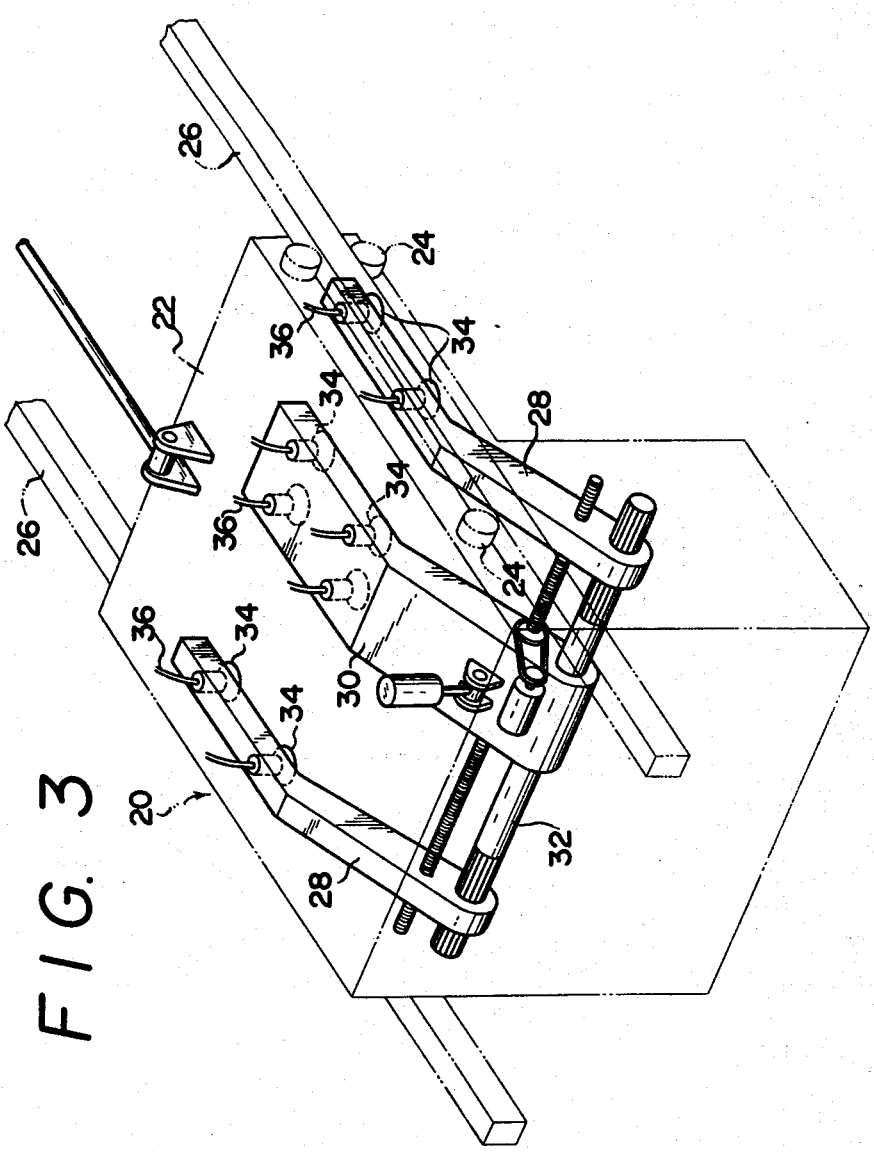
FIG. 3 is an enlarged perspective view of the loader in the multiple mode palletizing apparatus of FIGS. 1 and 2.

FIG. 3 is a detailed representation of the loader 20. It comprises a carriage 22 having wheels 24 on its opposite sides in rolling engagement with a pair of horizontal guide rails 26. The carriage 22 has three arms 28 and 30 mounted on its underside for joint pivotal motion about a pivot pin 32 extending horizontally across the guide rail pair 26. The arms 28 and 30 carry a suitable number of suction cups 34 opening downwardly and communicating with a vacuum pump, not shown, by way of conduits 36. Thus, raised from the conveyor 16 by the lifter 18, each pressing P becomes held against the suction cups 34 and attached thereto by virtue of a partial vacuum created therein. It will be seen that the two outer arms 28 of the loader 20 are made adjustably movable toward and away from the central arm 30 to adjust to the varying sizes of the pressings to be made by the transfer press system 12. Each sucked pressing P travels from pickup station II to loading station III with the rolling motion of the carriage 22 along the guide rail pair 26.

At the loading station III the loader 20 releases the successive pressings P either in the original recumbent or horizontal posture or, after turning them through an angle of 90 degrees about the pivot pin 32, in an upstanding attitude, depending upon the intended palletizing mode. Either a controlled or a free-fall flatwise loading mode is possible for the pressings released in the horizontal attitude whereas an insert loading mode and an edgewise loading mode are available for the pressings released upstandingly. The four different loading modes will hereinafter be discussed in detail in conjunction with associated means.

Figure 4:
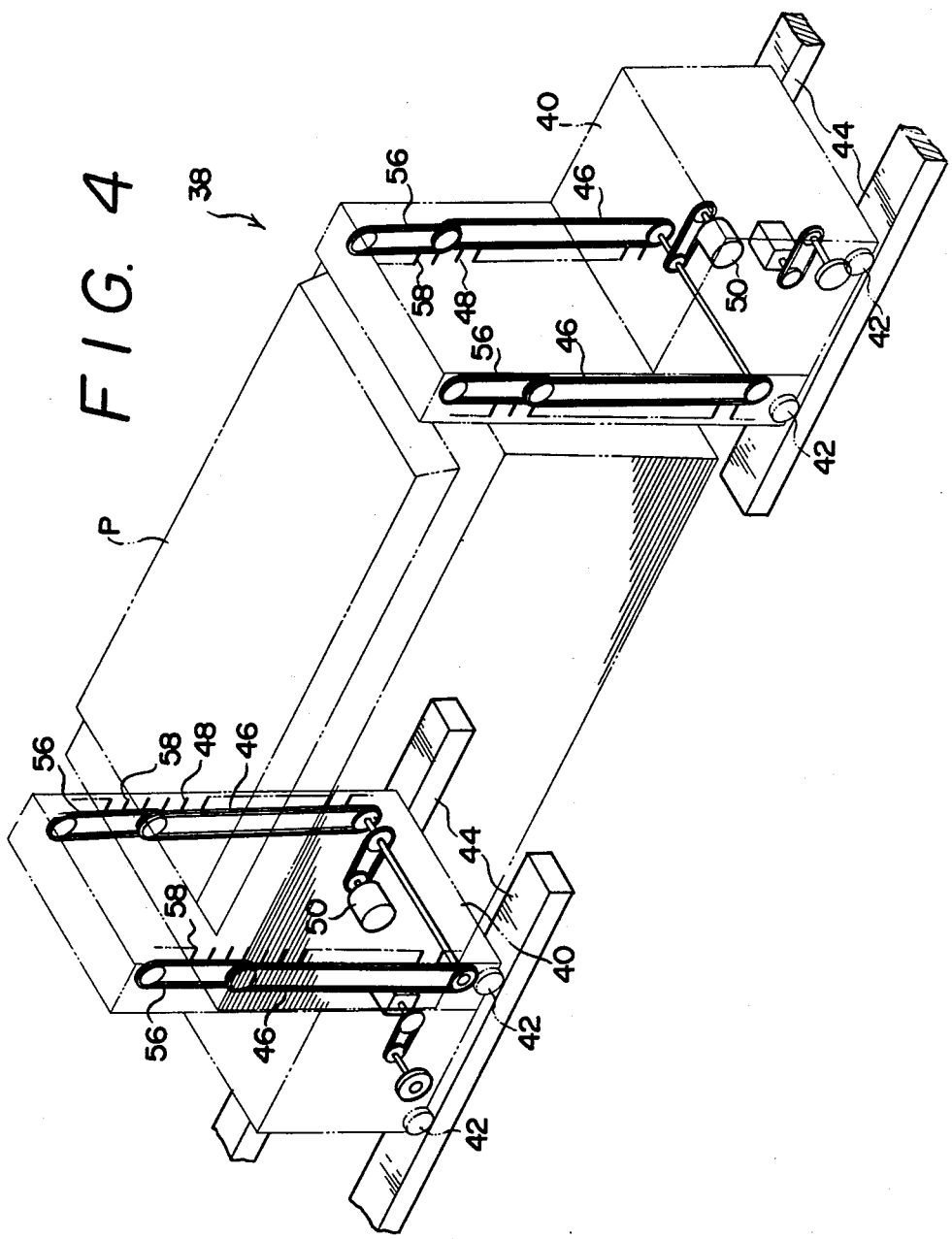
FIG. 4 is an enlarged perspective view of the controlled flatwise loading mechanism in the multiple mode palletizing apparatus.

FIG. 4 shows in detail the means for use in palletizing the horizontally released pressings P in the controlled flatwise loading mode. The reference numeral 38 in this figure generally denotes the controlled flatwise loading mechanism. It comprises a pair of opposed carriages 40 having wheels 42 for rolling motion toward and away from each other along respective tracks 44. Mounted to the carriages 40 are two horizontally opposed pairs of endless chains 46 generally extending vertically. Each endless chain 46 has a series of tines 48 affixed thereto at constant spacings. Each pair of endless chains 46 are driven jointly from a stepper motor 50 mounted in one of the carriages 40.

Released horizontally from the loader 20, each pressing P falls on four topmost ones of the tines 48 on the two pairs of endless chains 46 and is thereby supported in the vicinities of its four corners. The spacing between the two pairs of tined chains 46 is adjustable to the length of each pressing P as the carriages 40 roll along the tracks 44. Each time one pressing P falls on the tines 48, the two stepper motors 50 synchronously advance the endless chains 46 a unit distance equal to the pitch of the tines, thereby causing gradual, controlled descent of the successive pressings onto a pallet seen at 52 in FIG. 2. The pallet is positioned on an elevator 54. When a predetermined number of pressings P are stacked flatwise on the pallet 52, the elevator 54 lowers the loaded pallet from the second floor 2FL, where it has been loaded, to the ground floor 1FL for delivery to a place of storage or shipment.

The transfer press system 12 continues the production of the pressings during the time from the descent of the loaded pallet to the ascent of an empty pallet on the elevator 54. For receiving and temporarily holding the pressings released from the loader 20 during the change from the loaded to an empty pallet, the flatwise loading mechanism 38 has two additional opposed pairs of endless chains 56, also having tines 58, forming upward extensions of the first recited pairs of tined chains 46.

Figure 5:
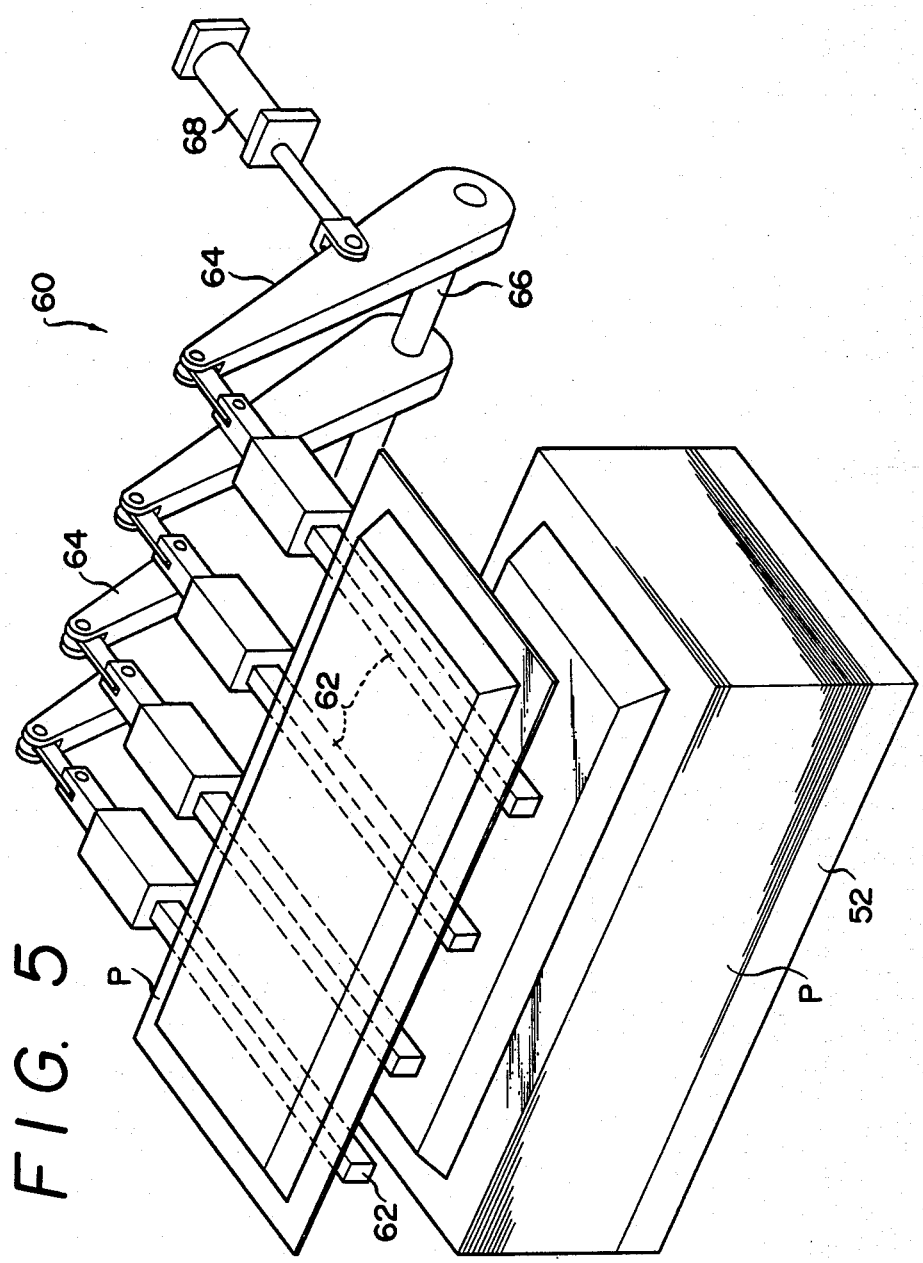
FIG. 5 is an enlarged perspective view of the retractable fork assembly in the multiple mode palletizing apparatus.

As the nature of the pressings P permit, they may be allowed to fall freely onto the pallet 52 on the elevator 54 on being released from the loader 20 in the horizontal attitude. FIG. 5 illustrates a retractable fork assembly 60 for receiving and temporarily holding the pressings P released from the loader 20 during each change from a loaded to an empty pallet while the apparatus is in operation in the free-fall flatwise loading mode.

The retractable fork assembly 60 comprises a set of prongs 62 operatively connected to respective support arms 64 which are pivotable about a common shaft 66 arranged under and extending transversely of the conveyor 16. A fluid actuated cylinder 68, coupled to one of the support arms 64, normally holds the set of prongs 62 in a retracted position at the pickup station II. Upon loading of a predetermined number of pressings P on the pallet 52 on the elevator 54 in the free fall mode, the cylinder 68 is extended to move the set of prongs 62 to the working position at the loading station III. In this working position the fork assembly receives and holds the pressings P being released horizontally from the loader 20 until the elevator 54 comes up to the level of the fork assembly with an empty pallet. Then the pressings that have been deposited on the set of prongs 62 are transferred onto the pallet, and the fork assembly returns to the retracted position at the pickup station II. The elevator 54 subsequently lowers the pallet to the level of the second floor 2FL, and the free-fall flatwise loading of the pressings is resumed on the pallet.

If the pressings being made by the transfer press system 12 have suitable apertures formed therein, such as indicated at 70 in FIG. 6, then they may be palletized in the insert loading mode. FIG. 6 shows the insert loading mechanism 72 together with a pallet 52' on which the apertured pressings P' are to be mounted in the insert loading mode. The pallet 52' has a plurality of, three in the illustrated embodiment, uprights 74 erected thereon, with each upright having an arm 76 extending horizontally from its top end.

The insert loading mechanism 72 comprises a first pair of hangers 78 carried by a first pair of endless chains 80 extending horizontally, and a second pair of hangers 82 carried by a second pair of endless chains 84 extending parallel to the first endless chain pair. The first pair of endless chains 80 are driven by respective bidirectional motors 86 whereas the second pair of endless chains 84 are driven by a common bidirectional motor 88.

For palletization in the insert mode the first pair of hangers 78 are held in the position to engage in the apertures 70 in each pressing P' as the latter is turned 90 degrees to the upstanding posture by the pivotal arms 28 and 30, FIG. 3, of the loader 20. Subsequently released from the loader 20, the pressing P' suspends from the first hanger pair 78. The motors 86 cause gradual retraction of the first hanger pair 78 toward the uprights 74 on the pallet 52' as the successive apertured pressings P' are loaded on the first hanger pair in the above described manner. Upon loading of a prescribed number of pressings P' on the first hanger pair 78, the second hanger pair 82, driven by the motor 88, operates to remove the pressings from the first hanger pair and to carry them onto the pallet 52' with the result that the horizontal arms 76 of the uprights 74 become inserted in the apertures 70 in the pressings. Now the pressings have been loaded on the pallet 52' by being suspended from the horizontal arms 76.

When loaded fully, the pallet 52' retracts to a delivery line 90, FIG. 1, on a conveyor (not shown). Then an empty pallet is conveyed to the position of FIG. 6. During this change from the loaded to the empty pallet the first hanger pair 76 receives the apertured pressings P' released uprightly from the loader 20.

The pallet with the uprights 74 also allows the pressings, either apertured or nonapertured, to be loaded edgewise thereon. For this edgewise loading mode, as for the above insert loading mode, the pallet is positioned on the unshown conveyor extending from the loading station III in a direction away from the conveyor 16. Released uprightly from the loader 20, each pressing is directly loaded edgewise on the pallet, leaning against the uprights thereon. With the edgewise loading of each pressing the pallet is retracted a unit distance away from the loader by the unshown conveyor on which it lies.

Upon completion of the edgewise loading of a predetermined number of pressings the pallet retreats to the delivery line 90. Immediately tthereafter an ampty pallet is placed on the unshown conveyor and thereby transported to the loading station III for the loading of the subsequent pressings thereon.

It is apparent from the foregoing that there has been invented apparatus greatly expediting the palletization of the pressings made by a transfer press system, among other articles. A variety of pressings can be palletized in a variety of modes that have been chosen to suit the natures of the pressings. One skilled in the art will recognize that the apparatus lends itself to ready automation. Various modifications and alterations may be contemplated and resorted to by the specialits to conform to design preferences or specific requirements of intended applications, without departing from the spirit or scope of the invention as expressed in the following claims.

What is claimed is:

1. Apparatus for loading generally flat articles, either apertured or nonapertured, on pallets in any of several different modes depending upon the physical characteristics of the articles, comprising:
   (a) a conveyor for transporting in a recumbent attitude a succession of articles to be palletized from a supply station to a pickup station;
   (b) a loader for picking up one article at a time from the conveyor at the pickup station and carrying the article to a loading station away from the conveyor, the loader releasing the article either in the recumbent attitude or, after turning the article through an angle of 90 degrees, in an upstanding attitude;
   (c) a controlled flatwise loading mechanism for receiving the successive articles released recumbently from the loader and successively depositing the articles flatwise on a pallet at the loading station;
   (d) a retractable fork assembly for use in loading the articles from the loader onto a pallet at the loading station in a free-fall flatwise loading mode, the fork assembly being held in a working position at the loading station for receiving the articles released recumbently from the loader during each change from a loaded pallet to an empty pallet;
   (e) an insert loading mechanism for receiving the articles released upstandingly from the loader and loading the articles on a pallet having erected thereon a plurality of uprights having arms extending horizontally from their top ends to engage in apertures in the articles;
   (f) the pallet with the uprights being also adapted to allow the successive articles released upstandingly from the loader to be loaded edgewise thereon by leaning against the uprights.

2. The multiple mode palletizing apparatus of claim 1, wherein the loader comprises:
   (a) a carriage movable between the pickup station and the loading station; and
   (b) a plurality of suction cups pivotally supported on the underside of the carriage.

3. The multiple mode palletizing apparatus of claim 1, wherein the controlled flatwise loading mechanism comprises:
   (a) two horizontally opposed pairs of endless chains extending vertically; and
   (b) a series of tines affixed to each endless chain at constant spacings for receiving the successive articles thereon and descending the same onto the pallet with the movement of the chains.

4. The multiple mode palletizing apparatus of claim 3, wherein the controlled flatwise loading mechanism further comprises means for varying the spacing between the two opposed pairs of endless chains.

5. The multiple mode palletizing apparatus of claim 1, wherein the insert loading mechanism comprises:
   (a) first and second pairs of endless chains extending horizontally from the loading station in a direction away from the conveyor;
   (b) a first pair of hangers carried by the first pair of endless chains for receiving the successive articles from the loader by engaging in the apertures therein; and
   (c) a second pair of hangers carried by the second pair of endless chains for receiving each prescribed number of articles from the first pair of hangers, also by engaging in the apertures in the articles, and transferring the articles onto the horizontal arms of the uprights on the pallet.

* * * * *